United States Patent [19]

Lenney

[11] Patent Number: 5,124,394
[45] Date of Patent: Jun. 23, 1992

[54] HIGH SOLIDS VINYL ACETATE-ETHYLENE COPOLYMER EMULSIONS PREPARED USING A STABILIZING SYSTEM COMPRISING POLY(ETHYLOXAZOLINE)

[75] Inventor: William E. Lenney, Allentown, Pa.

[73] Assignee: Air Products and Chemicals, Inc., Allentown, Pa.

[21] Appl. No.: 684,630

[22] Filed: Apr. 12, 1991

[51] Int. Cl.⁵ .................................................. C08F 2/16
[52] U.S. Cl. ................................... 524/459; 524/458; 524/719
[58] Field of Search ................ 524/458, 459, 719

[56] References Cited

U.S. PATENT DOCUMENTS

| | | | |
|---|---|---|---|
| 2,413,197 | 12/1946 | Smith et al. | 524/719 |
| 3,382,197 | 5/1968 | Purcell et al. | 524/719 |
| 4,328,149 | 5/1982 | Morse et al. | 524/458 |
| 4,528,315 | 7/1985 | Eck et al. | 524/458 |
| 4,698,384 | 10/1987 | Mao | 524/458 |
| 4,735,986 | 4/1988 | Iacoviello | 524/458 |
| 4,921,898 | 5/1990 | Lenney | 524/459 |

Primary Examiner—Joseph L. Schofer
Assistant Examiner—J. M. Reddick
Attorney, Agent, or Firm—Michael Leach; James C. Simmons; William F. Marsh

[57] ABSTRACT

A method for preparing an aqueous copolymer emulsion comprising the aqueous copolymerization of vinyl acetate and ethylene in the presence of a stabilizing system consisting essentially of a stabilizing effective amount of poly(ethyloxazoline).

20 Claims, No Drawings

HIGH SOLIDS VINYL ACETATE-ETHYLENE COPOLYMER EMULSIONS PREPARED USING A STABILIZING SYSTEM COMPRISING POLY(ETHYLOXAZOLINE)

FIELD OF THE INVENTION

The invention relates to aqueous vinyl acetate-ethylene copolymer emulsions prepared by emulsion polymerization in the presence of a stabilizing system.

BACKGROUND OF THE INVENTION

Polyvinyl alcohol (PVOH) is a water soluble polymer that has been used for decades as a stabilizer in the synthesis of polyvinyl acetate homopolymer and copolymer emulsions for use as water based adhesives. While PVOH does provide some adhesion of the copolymer to cellulosics, it can hinder film formation and adhesion to plastics. In addition, PVOH is not compatible with boric acid and its derivatives. To enhance adhesiveness of the polyvinyl acetate polymers to synthetic materials and to be compatible with borate/starch mixtures, the removal of PVOH becomes necessary.

U.S. Pat. No. 4,921,898 discloses vinyl acetate-ethylene (VAE) copolymer emulsions of about 65-70% solids prepared by copolymerization of vinyl acetate and ethylene monomers in the presence of a stabilizing system consisting essentially of low molecular weight PVOH and nonionic surfactant.

SUMMARY OF THE INVENTION

The present invention provides an aqueous dispersion, or emulsion, of vinyl acetate-ethylene (VAE) copolymers which are useful in aqueous based applications such as adhesives, paints, and carpet compounds. The VAE copolymer is dispersed in an aqueous medium and is prepared by the aqueous emulsion copolymerization of vinyl acetate and ethylene in the presence of a stabilizing system consisting essentially of poly(ethyloxazoline).

In a preferred embodiment for making VAE copolymer emulsions of high solids, i.e., greater than 60 wt % solids, the amount of the water insoluble monomers vinyl acetate and ethylene relative to water is such as to provide a water-in-oil (water-in-monomer) emulsion during the initial stages of polymerization which subsequently phase inverts into an oil-in-water emulsion as the monomers are consumed by polymerization. The stabilizing system will also preferably contain a nonionic surfactant and, optionally, a low molecular weight PVOH which is 75-99+mole % hydrolyzed and has an average degree of polymerization (DPn) ranging from 100 to 600. The resulting copolymer emulsions will comprise about 60 to 70 wt % solids, preferably 60 to 65 wt % solids, with a viscosity of less than about 3,000 cps, preferably less than 1500 cps, at 60% solids, 60 rpm, 25° C. and pH5.

The VAE copolymer emulsions exhibit improved adhesion to plastics, borax stability and destabilization tendencies when heated above 60° C.

DETAILED DESCRIPTION OF THE INVENTION

The VAE copolymers according to the invention comprise 60-95 wt % vinyl acetate and 5-40 wt % ethylene, preferably the copolymer contains 75-85 wt % vinyl acetate and 15-25% ethylene to provide a $T_g$ ranging from about −15° to 10° C.

Contemplative as the functional, or operative, equivalent of vinyl acetate in the copolymer emulsions are vinyl esters of alkanoic acids, such as vinyl formate, vinyl propionate, vinyl laurate and the like.

The VAE copolymers may optionally include one or more additional ethylenically unsaturated copolymerizable monomers. Exemplary of such comonomers, which may be present at up to 10 wt % or more, are $C_3$-$C_{10}$ alkenoic and alkenedioic acids, such as acrylic acid, crotonic acid and isocrontonic acid, maleic acid, furmaric acid and itaconic acid and their mono- and diesters with $C_1$-$C_{18}$ alkanols, such as methanol, ethanol, propanol, butanol and 2-ethylhexanol; vinyl halides such as vinyl chloride; and nitrogen-containing monoethylenically unsaturated monomers, particularly nitriles, amides, N-methylol amides, lower alkanoic acid esters of N-methylol amides, lower alkyl ethers of N-methylolamides and allylcarbamates, such as acrylonitrile, acrylamide, lower alkyl ethers and lower alkanoic acid esters of N-methylol acrylamide and N-methylol allylcarbamate. If such additional ethylenically unsaturated comonomer is used, about 2 to 5 wt % is preferred.

The stabilizing system for the polymerization reaction to prepare the aqueous VAE copolymer emulsions of the invention consists essentially of 2-20 wt % of a poly(ethyloxazoline), based on vinyl acetate monomer. The preferred amount of poly(ethyloxazoline) used in the stabilizing system is 4-10 wt %, based on vinyl acetate monomer. Suitable poly(ethyloxazoline) compositions would have an average molecular weight ranging from 50,000 to 500,000, preferably 50,000 to 200,000. Poly(ethyloxazoline) is marketed by The Dow Chemical Company under the PEOX trademark.

In addition to the poly(ethyloxazoline) component, the stabilizer system preferably also contains a surfactant at the level of about 3-6 wt %, preferably 2-4 wt %, based on a vinyl acetate monomer.

The surfactants contemplated by the invention include any of the known and conventional surfactants and emulsifying agents, principally the nonionic and anionic materials, employed in the emulsion copolymerization of vinyl acetate and ethylene, the nonionic polyalkoxylated surfactants being especially preferred. Among the nonionic surfactants which have been found to provide good results are included the Igepal surfactants marketed by GAF and the Pluronic surfactants marketed by BASF. The Igepal surfactants are members of a series of alkylphenoxy poly(ethyleneoxy) ethanols which can be represented by the general formula:

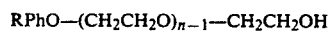

Where R represents an alkyl radical and n represents the number of moles of ethylene oxide employed. Illustrative are alkylphenoxy poly(ethyleneoxy) ethanols having alkyl groups containing from about 7-18 carbon atoms, inclusive, and having from about 4 to about 100 ethyleneoxy units, preferably 30 to about 40 ethyleneoxy units, such as the octylphenoxy poly(ethyleneoxy) ethanols, nonylphenoxy poly(ethyleneoxy) ethanols and the dodecylphenoxy poly(ethyleneoxy) ethanols.

The Pluronic surfactants are condensates of ethylene oxide with a hydrophobic base formed by condensing propylene oxide with propylene glycol, and the like. Suitable nonionic surfactants also include polyoxyalkylene derivatives of hexitol (including sorbitans, sorbides, mannitans and mannides) anhydride, partial long-chain fatty acid esters, such as the polyoxyalkylene derivatives of sorbitan monolaurate, sorbitan monopalmitate, sorbitan monostearate, sorbitan tristearate, sorbitan monooleate, and sorbitan trioleate. Other suitable nonionic surfactants which can be employed are alkyleneoxide derivatives of long chain fatty alcohols, such as octyl, dodecyl, lauryl, or cetyl alcohol and polyethoxylated derivatives of acetylenic alcohols which are marketed under the registered trademark "Surfynol" by Air Products and Chemicals, Inc.

In addition to the poly(ethyloxazoline) and surfactant, the stabilizing system may also contain polyvinyl alcohol (PVOH), suitably in amounts ranging from 0.5 to 2 wt %, based on vinyl acetate monomer. The PVOH which is used in the stabilizing system can be 75-99-+mole % hydrolyzed, preferably 85-90 mole %, and especially 87-89 mole % hydrolyzed, and has a DPn ranging from 100-600, preferably 185-255.

The poly(ethyloxazoline) is preferably added to the polymerization reaction medium all at once prior to initiation, but can be added incrementally during the course of the polymerization, provided a sufficient amount is present initially to provide inverse phase (water in organic monomer) emulsion stability. Any PVOH and/or surfactant in the stabilizing system can likewise be added with the poly(ethyloxazoline).

Various free-radical forming sources can be used in carrying out the polymerization of the monomers, such as conventional peroxide compounds. Combination-type systems employing both conventional oxidizing agents and reducing agents can also be used, i.e., a redox system.

The oxidizing agent is generally employed in an amount of 0.01-1%, preferably 0.05-0.5%, based on the weight of vinyl acetate introduced into the polymerization system. The reducing agent is ordinarily added as an aqueous solution in the necessary equivalent amount.

A preferred composition of the VAE copolymer emulsion would comprise the following:

| | |
|---|---|
| Water | 35% |
| Solids | 65% |
| Vinyl acetate monomer | 78% |
| Ethylene | 16% |
| Surfactant | 3% |
| Poly(ethyloxazoline) | 4% |
| Redox system, salts | 1% |

In general, suitable VAE copolymer emulsions can be prepared by copolymerization of the monomers in the presence of the poly(ethyloxazoline)-containing stabilizing system in an aqueous medium under ethylene pressures up to about 100 atm using a redox system which is added incrementally. The process first involves a homogenization in which the vinyl acetate suspended in water is thoroughly agitated in the presence of ethylene under the working pressure to effect solution of the ethylene in the vinyl acetate while the reaction medium is gradually heated to polymerization temperature. The homogenization period is followed by a polymerization period during which the redox system is added incrementally.

The reaction temperature can be controlled by the rate of redox addition and the rate of heat dissipation. Generally, it is advantageous to maintain a mean temperature of about 60° C. during the polymerization of the monomers and to avoid temperatures much in excess of 70° C.

In carrying out the polymerization, an amount of the vinyl acetate is initially charged to the aqueous medium in the polymerization vessel and saturated with ethylene. Most advantageously, at least about 50%, preferably at least about 75% and, most desirably, all of the vinyl acetate to be polymerized is initially charged, but at least that amount necessary to form a water-in-monomer emulsion, and the remainder of the vinyl acetate, if any, and any addition comonomers are added incrementally during the course of the polymerization period. Regardless of the amount of the total vinyl acetate monomer that is initially charged to the reactor, it seems that at least about 55 wt parts vinyl acetate per 45 parts water is required for a water-in-monomer emulsion.

When reference is made to incremental addition, substantially uniform additions, both with respect to quantity and time, are contemplated. Such additions can be continuous or discontinuous and are also referred to as "delay" additions.

The quantity of ethylene entering into the copolymer is influenced by the pressure, agitation and viscosity of the polymerization medium. Thus, to increase the ethylene content of the copolymer, high pressures, greater agitation and a low viscosity are employed. The pressurized ethylene source can be shut off from the reactor so that the ethylene pressure decays as it is polymerized or it can be kept open to maintain the ethylene pressure throughout the reaction, i.e., make-up ethylene.

After thoroughly agitating the aqueous reaction mixture to dissolve ethylene in the vinyl acetate and in the water phase, the charge is brought to polymerization temperature and polymerization is then initiated by introducing initial amounts of the oxidant and the reductant. After polymerization is started, the oxidant and reductant are incrementally added as required to continue polymerization. Any other copolymerizable monomers and the remaining vinyl acetate, if any, may be added as separate delays.

The reaction is generally continued until the residual vinyl acetate is below about 0.5%; the completed reaction product is then allowed to cool to about room temperature while sealed from the atmosphere. The pH is then suitably adjusted to a value in the range of 4.5-7, especially 4.5-5, to insure maximum stability.

A preferred method for producing the high solids, low viscosity, VAE copolymer emulsions is a "cold initiation" process which comprises first forming an aqueous water-in-monomer emulsion of vinyl acetate and the stabilizing system in the reactor. The reactor is then pressurized with ethylene to an ethylene-equilibrium pressure of about 100-800 psig. The resulting reaction mixture is adjusted to a temperature from about 10°-30° C. Polymerization is initiated by the addition of a free radical source at a rate such that the reaction mixture is brought to a temperature of 45°-70° C., preferably 55°-60° C., within a period of 1.5 hours or less, preferably one hour. The delayed additions are commenced when initiation is observed. The polymerization is continued at this high temperature range through the phase inversion and until the vinyl acetate content is below about 0.5%.

VAE copolymer emulsions can be directly produced having a solids content of about 60-70% and a viscosity of less than about 3,000 cps, preferably less than about 1,500 cps, at 60% solids, and at 60 rpm, 25° C. and pH5.

By initiating the polymerization at a high monomers-to-water ratio, an inverse emulsion is formed. Here the monomers function as the continuous phase. As the polymerization proceeds, the monomer concentration decreases and an inversion takes place. The aqueous phase now becomes the continuous phase. The distribution of growing emulsion particles is determined by the inversion process which is regulated in part by the poly(ethyloxazoline) and nonionic surfactant concentrations and grades. It is believed that a broad particle size distribution is formed by this technique in the presence of the particular stabilizing system leading to an increase to the polydispersity and relatively low viscosity at high solids.

EXAMPLE 1

The following is a general procedure for preparing the VAE copolymer emulsions of the invention using a 1 gallon stainless steel pressure reactor.

The components of the initial reactor charge and the various delay feeds are as follows:

| Initial Reactor Charge | | |
|---|---|---|
| (1) DI Water | | 825 g |
| (2) Ferrous Ammonium Sulfate 1% aq soln | | 5 g |
| (3) Igepal CO-887[a] | | 84 g |
| (4) Vinyl Acetate/PEOX 50[b] | VAM | 1872 g |
| | PEOX 50 | 78 g |
| (5) Acetic Acid | | 0.1 g |
| (6) Ethylene - Quantity to Equilibrate Reactor to 550 psi @ 25° C. | | |

[a]Nonylphenoxy poly(ethyleneoxy)ethanol (EO = 30) marketed by GAF Corp. 70% aqueous solution of Igepal CO-880 surfactant.
[b]Poly(ethyloxazoline) marketed by Dow Chemical.

| Delay Feeds | |
|---|---|
| (1) Hydrogen peroxide, 0.6% aq. soln | 14 ml |
| (2) Hydrogen peroxide, 1.0% aq soln | 105 ml |
| (3) Hydrogen peroxide, 7.0% aq soln | 56 ml |
| (4) Zinc formaldehyde sulfoxylate, 10% aq soln | 91 ml |
| (5) Ammonium hydroxide, 14% aq soln | 10 ml |

The initial distilled water charge is adjusted to pH 4.5 with acetic acid. The Igepal CO-887 surfactant is dissolved in the pH adjusted distilled water and the ferrous ammonium sulfate solution added. This aqueous premix is charged to a purged 1 gallon reactor which was previously filled with water and blown dry with nitrogen. Agitation is commenced at 200 rpm and the vinyl acetate containing the predissolved PEOX 50 is added to the reactor. The reactor is purged twice (subsurface) with nitrogen (30 psi) and once with ethylene (30 psi) at 30° C. After 0.5 hr at 200 rpm, the agitation is increased to 900 rpm, the reactor is pressurized to 500 psi with ethylene (substrate) and temperature adjusted to 30° C. The reactor temperature and the ethylene pressure are allowed to equilibrate at 30° C. and 500 psi.

The reaction is initiated using the 0.6% aqueous hydrogen peroxide solution at 0.4 ml/min and the 10% zinc formaldehyde sulfoxylate solution at 0.5 ml/min. When initiation is observed, the oxidant is switched to 1% aqueous hydrogen peroxide. The process temperature ramp to 60° C. over a 1 hr period is then started by adjusting the 1% aqueous hydrogen peroxide solution to achieve a 14° C. ΔT or a 46° C. jacket temperature at the 1 hr mark. When the process reaches 60° C. at about the 1 hr mark, the ethylene pressure makeup is set to 600 psi, the automatic 1% hydrogen peroxide control set point is set to 46° C., and the 10% zinc formaldehyde sulfoxylate solution is continued at 0.5 ml/min.

When the residual vinyl acetate free monomer level drops to less than 3%, the 1% hydrogen peroxide addition is ceased and the 7% aqueous hydrogen peroxide solution is added at 0.5 ml/min increasing to 1 ml/min after ten minutes. The ethylene supply make-up is stopped and the agitator speed increased to 1,000 rpm. The zinc formaldehyde sulfoxylate solution delay is ended and 14% ammonium hydroxide solution is started at 0.1 ml/min to avoid a pH drop. When the 7% hydrogen peroxide delay is completed, the contents are then cooled to 30° C. and the pH adjusted to 5 with additional 14% ammonium hydroxide. After pH adjustment and at 30° C. the contents are batch transferred to a degasser. During the transfer degasser agitation at 200 rpm is begun and Colloid 585 defoamer is added.

After the emulsion transfer to the degasser is completed, 25 g of distilled water containing 2.5 g t-butylhydroperoxide, 1.6 g sodium acetate and 1.6 g sodium citrate is pumped into the degasser at 1 ml/min. After post-treatment is completed, the degasser agitation is reduced to 100 rpm. The post reaction period is generally several hours.

Following the above general procedure, an emulsion product (Run A) having the properties set forth in Table 1 was obtained. Commercial VAE copolymer emulsion (Comm A) was prepared using a stabilizing system comprising a low molecular weight PVOH and a nonylphenoxy poly(ethyleneoxy) ethanol as taught in U.S. Pat. No. 4,921,898. Commercial VAE copolymer emulsion (Comm B) was prepared using PVOH as the stabilizing system.

TABLE 1

| VAE EMULSION PRODUCTS | | | |
|---|---|---|---|
| | Run A | Comm A | Comm B |
| Colloidal Properties | | | |
| Solids (%) | 66.7 | 66 min | 55 min |
| pH | 5.2 | 4.5–5.5 | 4–5 |
| Viscosity | | | |
| 12 rpm | 2,955 | — | — |
| 20 rpm | 2,170 | 800–1300 | 1900–2000 |
| 60 rpm | 1,506 | — | 1400–2000 |
| Particle size | | | |
| Dw, μm | 0.77 | — | — |
| Dn | 0.28 | — | — |
| Dw/Dn | 2.79 | — | — |
| Copolymer Properties | | | |
| Tg (°C.) | −4.5 | −5 ± 3 | 0 ± 3 |
| Toluene Insol. (%) | 82 | 35–45 | 65–75 |
| Adhesive Performance Values | | | |
| PVC/Cloth Peel (lb) | 3.3 | 3.9 | 2.9 |
| Speed of Set (sec) | 6–9 | 3–6 | 6–9 |
| Cloth to Cloth - wet (lb) | 1.9 | 2.2 | 1.4 |
| Thickening Ratio[a] | 2.3 | 2.5 | 6.0 |
| PET[b]/Cloth | 1.1 | 0.8 | 0.7 |
| OPP[c]/Cloth | 0.3 | 0.2 | 0.1 |

[a]10 parts plasticizer per 100 parts emulsion
[b]Polyethylene terephthalate
[c]Oriented polypropylene

EXAMPLE 2

Following the procedure of Example 1 VAE copolymer emulsions Runs B-E were prepared using various poly(ethyloxazoline)-containing stabilizing systems as shown in Table 2.

TABLE 2

| RUN | B | C | D | E |
|---|---|---|---|---|
| Vinyl acetate | 78 | 78 | 74 | 74 |
| Ethylene | 16 | 16 | 16 | 16 |
| Surfactant | 3[a] | 3[b] | 2 | 2 |
| PVOH | 0 | 0 | 1 | 3 |
| Poly(ethyloxazoline) | 4 | 4 | 4 | 4 |
| PROPERTIES OF EMULSION | | | | |
| Improved adhesion (Mylar) | yes | yes | yes | yes |
| Boric salt compatability | yes | yes | no | no |
| Emulsion destabilization with heating above 60° C. | yes | yes | — | — |

[a]Igepal CO-880 surfactant
[b]Pluronic L-64 surfactant

EXAMPLE 3

Again following the procedure of Example 1 four VAE copolymer emulsions were prepared in the presence of varying amounts of poly(ethyloxazoline). These VAE emulsions were compared to a commercial Airflex 465 VAE copolymer emulsion prepared in the presence of polyvinyl alcohol and nonionic surfactant. Table 3 compares the tensile data showing how the base VAE tensile strengths were enhanced by copolymerization in the presence of PEOX 50.

TABLE 3

| Run | % PEOX | 100 Modulus (psi) | Ult. Tensile (psi) | Percent Elongation |
|---|---|---|---|---|
| Airflex 465 | 0 | ~80 | ~200 | ~1300 |
| G | 2 | 70 | 206 | 1212 |
| H | 6 | 88 | 280 | 1214 |
| I | 8 | 102 | 252 | 1180 |
| J | 10 | 122 | 307 | 1362 |

STATEMENT OF INDUSTRIAL APPLICATION

The present invention regarding the use of poly(ethyloxazoline) in the aqueous emulsion copolymerization of vinyl acetate and ethylene provides high solids, stable emulsions for use in aqueous based applications such as adhesives, paints, and carpet compounding.

I claim:

1. In an aqueous vinyl acetate-ethylene copolymer emulsion prepared by polymerizing the vinyl acetate and ethylene monomers in the presence of a stabilizing system, the improvement which comprises a stabilizing system consisting essentially of poly(ethyloxazoline).

2. The emulsion of claim 1 in which the poly(ethyloxazoline) is 2-20 wt %, based on vinyl acetate monomer.

3. The emulsion of claim 1 in which the poly(ethyloxazoline) has a molecular weight ranging from 50,000 to 500,000.

4. The emulsion of claim 1 in which the stabilizing system also contains 3-6 wt % surfactant, based on vinyl acetate monomer.

5. The emulsion of claim 1 in which the stabilizing system also contains 0.5-2 wt % polyvinyl alcohol, based on vinyl acetate monomer.

6. The emulsion of claim 1 in which the copolymer also contains up to about 10 wt % of one or more ethylenically unsaturated copolymerizable monomers.

7. In an aqueous vinyl acetate-ethylene copolymer emulsion prepared by polymerizing the vinyl acetate and ethylene monomers in the presence of a stabilizing system, the improvement which comprises a stabilizing system consisting essentially of 2-20 wt %, based on vinyl acetate monomer, of a poly(ethyloxazoline) having a 50,000 to 500,000 molecular weight.

8. The emulsion of claim 7 in which the poly(ethyloxazoline) is 4-10 wt %, based on vinyl acetate monomer.

9. The emulsion of claim 7 in which the poly(ethyloxazoline) has a molecular weight ranging from 50,000 to 200,000.

10. The emulsion of claim 7 in which the stabilizing system also contains 3-6 wt % surfactant, based on vinyl acetate monomer.

11. The emulsion of claim 10 in which the surfactant is a nonionic polyalkoxylated surfactant.

12. The emulsion of claim 7 in which the stabilizing system also contains 0.5-2 wt % polyvinyl alcohol, based on vinyl acetate monomer.

13. The emulsion of claim 7 in which the copolymer also contains up to about 10 wt % of one or more ethylenically unsaturated copolymerizable monomers which are $C_3$-$C_{10}$ alkenoic and alkenedioic acids, mono- and diesters of $C_3$-$C_{10}$ alkenoic and alkenedioic acids with $C_1$-$C_{18}$ alkanols, vinyl halides and nitrogen-containing monoethylenically unsaturated monomers.

14. In an aqueous vinyl acetate-ethylene copolymer emulsion prepared by polymerizing the vinyl acetate and ethylene monomers in the presence of a stabilizing system, the improvement which comprises a stabilizing system consisting essentially of 4-10 wt %, based on vinyl acetate monomer, of a poly(ethyloxazoline) having a 50,000 to 200,000 molecular weight.

15. The emulsion of claim 14 in which the stabilizing system also contains 3-6 wt % nonionic polyalkoxylated surfactant, based on vinyl acetate monomer.

16. The emulsion of claim 15 in which the surfactant is an alkylphenoxy poly(ethyleneoxy) ethanol.

17. The emulsion of claim 16 on which the stabilizing system also contains 0.5-2 wt % polyvinyl alcohol, based on vinyl acetate monomer.

18. The emulsion of claim 14 in which the copolymer also contains up to about 10 wt % of one or more ethylenically unsaturated copolymerizable monomers which are $C_3$-$C_{10}$ alkenoic and alkenedioic acids, mono- and diesters of $C_3$-$C_{10}$ alkenoic and alkenedoic acids with $C_1$-$C_{18}$ alkanols, vinyl halides and nitrogen-containing monoethylenically unsaturated monomers.

19. The emulsion of claim 15 in which the copolymer also contains 2-5 wt % of one or more ethylenically unsaturated copolymerizable monomers which are acrylic acid, crotonic acid, isocrotonic acid, maleic acid, fumaric acid, and itaconic acid and their mono- and diesters with methanol, ethanol, propanol, butanol and 2-ethylhexanol; vinyl chloride; and acrylonitrile, acrylamide, lower alkyl ethers and lower alkanoic acid esters of N-methylol acrylamide and N-methylol allylcarbamate.

20. The emulsion of claim 16 which is greater than 60 wt % solids.

* * * * *